United States Patent
Greb et al.

(10) Patent No.: US 11,511,469 B2
(45) Date of Patent: Nov. 29, 2022

(54) HOT-RUNNER ASSEMBLY WITH INTERNALLY COOLED AXIALLY MOUNTED ELECTRIC ACTUATOR

(71) Applicant: Incoe Corporation, Auburn Hills, MI (US)

(72) Inventors: Scott Greb, Washington Township, MI (US); Anton Jorg, Grossostheim (DE); Christian Striegel, Hessen (DE)

(73) Assignee: Incoe Corporation, Auburn Hills, MI (US)

( * ) Notice: Subject to any disclaimer, the term of this patent is extended or adjusted under 35 U.S.C. 154(b) by 433 days.

(21) Appl. No.: 16/599,564

(22) Filed: Oct. 11, 2019

(65) Prior Publication Data

US 2021/0107190 A1 Apr. 15, 2021

(51) Int. Cl.
  *B29C 45/28* (2006.01)
  *B29C 45/27* (2006.01)

(52) U.S. Cl.
  CPC ........ *B29C 45/281* (2013.01); *B29C 45/2737* (2013.01); *B29C 2045/2824* (2013.01)

(58) Field of Classification Search
  CPC .............. B29C 45/2737; B29C 45/281; B29C 2045/2824
  See application file for complete search history.

(56) References Cited

U.S. PATENT DOCUMENTS

| | | | |
|---|---|---|---|
| 6,294,122 B1 | 9/2001 | Moss et al. | |
| 7,121,820 B2 | 10/2006 | Tooman et al. | |
| 8,192,191 B2 | 6/2012 | Tooman et al. | |
| 8,870,564 B2 | 10/2014 | Kim | |
| 9,492,960 B2 | 11/2016 | Galati | |
| 9,849,618 B1 | 12/2017 | Tooman et al. | |
| 9,937,648 B2 | 4/2018 | Galati | |
| 2003/0185091 A1 | 10/2003 | Koike et al. | |
| 2008/0014296 A1 | 1/2008 | Tooman et al. | |
| 2010/0285170 A1 | 11/2010 | Galati et al. | |
| 2012/0045536 A1 | 2/2012 | Galati et al. | |
| 2016/0274561 A1 | 9/2016 | Stone | |
| 2017/0151703 A1 | 6/2017 | de Oliveira Antunes et al. | |

FOREIGN PATENT DOCUMENTS

| | | |
|---|---|---|
| EP | 2679374 | 1/2014 |
| KR | 10-2010-0119484 | 11/2010 |
| WO | WO 2015/183332 | 12/2015 |

OTHER PUBLICATIONS

Notification of Transmittal of the International Search Report & Written Opinion dated Jan. 20, 2021, (20 pages).
European Search Report dated Jun. 5, 2020 (8 pages).

*Primary Examiner* — James Sanders
(74) *Attorney, Agent, or Firm* — Gunther Evanina; Butzel Long

(57) ABSTRACT

A hot-runner injection molding apparatus that facilitates use of electric actuators in a compact design includes a hot-runner manifold defining resin channels for conveying resin to nozzles that serve as conduits for introducing liquid resin into a mold cavity, a valve pin configured for linear movement along a longitudinal axis of the nozzle to control flow of liquid resin through the nozzle, and an electric actuator having a body containing an electric motor, wherein the electric actuator body includes channels for circulating a coolant.

3 Claims, 3 Drawing Sheets

HOT-RUNNER ASSEMBLY WITH INTERNALLY COOLED AXIALLY MOUNTED ELECTRIC ACTUATOR

FIELD OF THE DISCLOSURE

This disclosure pertains to a hot-runner injection molding apparatus having an electric actuator configured for circulating a coolant fluid within the body of the actuator to facilitate mounting of the actuator in close proximity to the hot-runner manifold while preventing overheating of the electric motor of the actuator, and more particularly to such apparatus wherein the actuator can be axially assembled on the hot-runner manifold without substantial lateral clearance, allowing a plurality of actuators to be assembled onto the manifold in very close proximity to each other.

DISCUSSION OF THE PRIOR ART

U.S. Pat. Nos. 9,492,960 and 9,937,648 disclose an apparatus for controlling fluid flow to a mold, which includes a manifold, a valve pin having a pin axis, a pin connector and a stem, the valve pin being drivable into and out of open and closed positions relative to the gate. An electric actuator comprising an electric motor comprised of a motor housing that houses a drive shaft having a drive gear and a drive axis, a transmission comprised of a gear shaft, the drive gear and the transmission gear being drivably interconnected and arranged such that the drive axis and the gear axis are non-coaxially mounted or disposed relative to each other, wherein one or the other of the motor housing or the transmission housing are removably attached to a top clamping or mounting plate that is mounted upstream of the manifold and fixedly interconnected to a mold.

U.S. Pat. No. 6,294,122 discloses an injection molding machine including an apparatus for controlling movement of a pin comprising a plastic melt flow channel having an output end for delivering molten plastic injected into the channel under pressure to a mold cavity, wherein the pin comprises an elongated rod having an axis and an end, the pin being slidably mounted within the channel for movement along its axis within the channel, an electrically driven motor drivably interconnected to an actuating mechanism, wherein the actuating mechanism is drivably interconnected to the end of the pin, the motor being controllably drivable to drive the pin through movement along its axis within the channel.

EP 2679374A1 discloses an apparatus for injection molding of plastic materials, which includes a hot runner, at least one injector, including a nozzle mobile within which is a valve pin driven by a rotary electric motor and an associated transmission including a screw-and-nut assembly for converting the rotation of the shaft of the electric motor into a translation of the valve pin. At least two from among the valve pin, the rotary electric motor and the screw-and-nut assembly are set parallel alongside one another.

BACKGROUND OF THE DISCLOSURE

In a hot-runner injection molding apparatus, the liquid resin (molten plastic) is maintained in a molten state within channels defined in a heated manifold. The channels convey the molten plastic material from an injection molding machine to one or more nozzles that convey the molten plastic to at least one mold cavity via gates defined at an interface between the nozzle and the mold cavity. After the mold cavity is filled, only the mold cavity is cooled to allow removal of a solid molded part. The resin in the manifold channels and nozzles are maintained at a temperature sufficient to keep the plastic in a liquid state, thus reducing cycle time and waste as compared with cold runner injection molding apparatuses, wherein the resin conveying channels are defined within the mold plates.

Because of the susceptibility of electric actuators to degradation and failure when exposed to the high temperatures needed at the hot-runner manifold, hydraulic or pneumatic actuators are typically employed in hot-runner injection molding apparatus to control the flow of molten resin into the mold cavity (or cavities). In these hot-runner injection molding apparatuses employing electric actuators, the electric actuators are positioned remotely from the manifold and/or are provided with external cooling means (e.g., a cooled plate between the manifold and actuator), adding considerable complexity and expense as compared with the more conventionally used pneumatic or hydraulic actuators.

Despite these generally recognized disadvantages with electric actuators, they also have advantages, including the ability to more precisely control valve pin movement and positioning, which in turn can have associated advantages pertaining to part quality and production efficiency.

SUMMARY OF THE INVENTION

This disclosure addresses the need for utilizing electric actuators for controlling valve pin position and movement in a hot-runner injection molding apparatus, while protecting the actuator from overheating and providing a more compact apparatus that does not use separate cooling plates or require remote mounting of the actuator. The apparatus includes a hot-runner manifold having a resin channel for conveying a liquid resin from an injection molding machine toward a mold cavity, a nozzle for conveying the liquid resin from an outlet end of the resin channel to an inlet of a mold cavity, a valve pin configured for linear movement along a longitudinal axis of the nozzle to control flow of the liquid resin through the nozzle and into the mold cavity, and a directly cooled electric actuator having an electric motor and a linear drive shaft, wherein both the electric motor and the linear drive shaft are contained within the body of the electric actuator, and wherein the valve pin is directly or indirectly coupled to the drive shaft such that linear movement of the drive shaft produces co-linear movement of the valve pin.

The directly cooled electric actuator can be mounted in a space between the hot-runner manifold and an upper mounting plate.

In certain aspects of this disclosure, the directly cooled electric actuator is directly and releasably attached to a support having a relatively high resistance to conductive heat transfer (e.g., stainless steel or titanium).

In particular embodiments, the directly cooled electric actuator has, within the body of the actuator, a linear drive shaft and a transmission mechanism that converts rotational movement of the electric motor into translational movement of the drive shaft.

In particular aspects of this disclosure, the linear drive shaft has an internally threaded bore extending along the length of the shaft, and the body and/or housing of the actuator has openings at opposite ends (e.g., top and bottom) to allow access to the opposite ends of the threaded bore. This arrangement allows the upper end of the valve pin to extend upwardly into the internally threaded bore for engagement with an externally threaded valve pin nut. An externally threaded lock nut can be tightened against the valve pin nut on the side opposite of the valve pin to lock the position of the valve pin relative to the liner drive shaft.

The disclosed arrangement allows the actuator to be assembled onto the manifold along and coincident with the longitudinal axis of the nozzle and valve pin without requiring movement of the actuator laterally (i.e., radially) from the axis, thereby making it possible to design hot-runner injection molding systems (i.e., apparatus) having a plurality of nozzles, valve pins and actuators in closer proximity to each other than would otherwise be possible.

The arrangement allows an upper end of the valve pin (or a valve pin extension) to be positioned within the drive shaft and therefore within the body of the actuator, facilitating a vertically compact design.

DETAILED DESCRIPTION

Figure 1:
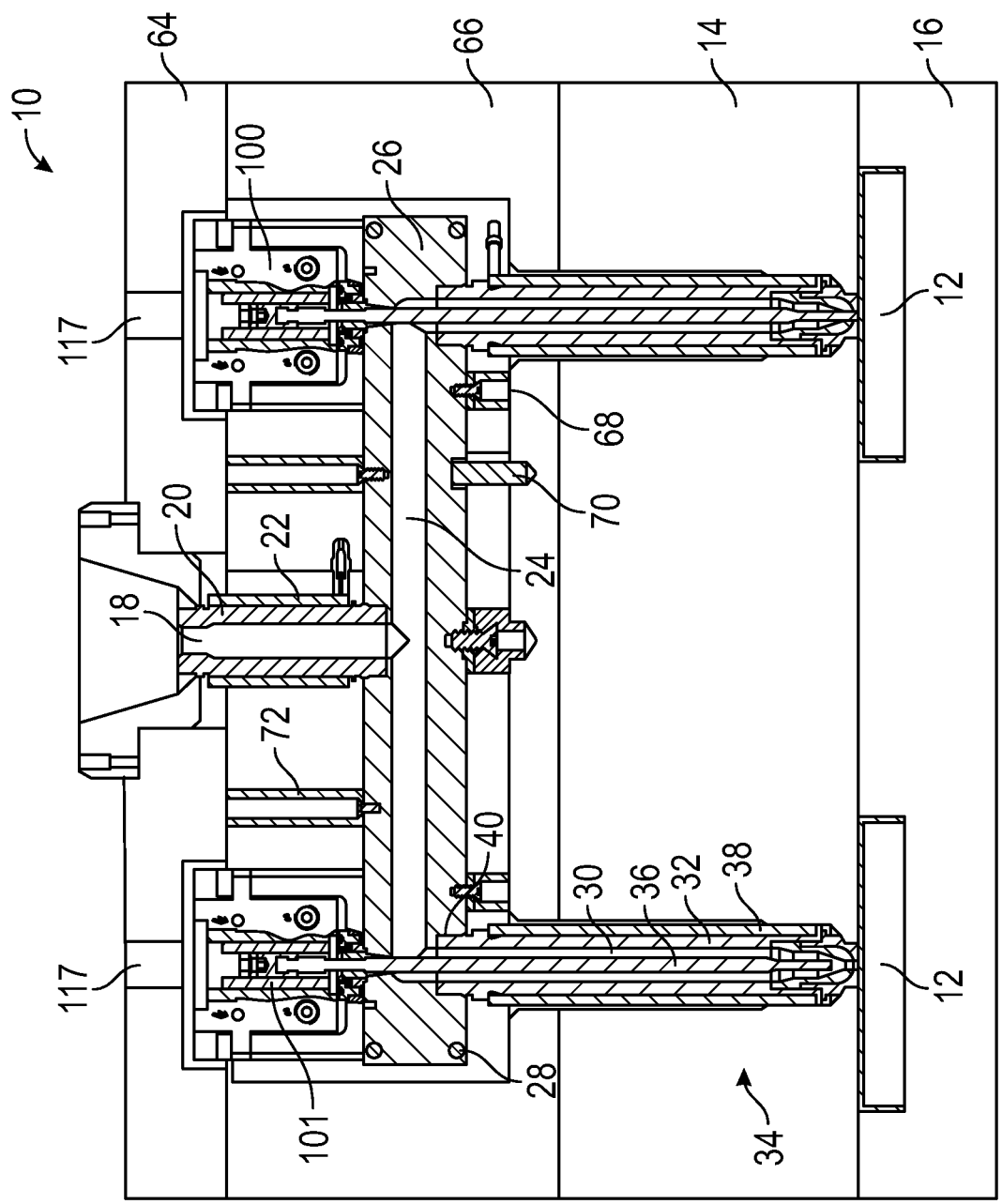
FIG. 1 is an elevational cross-section of an apparatus in accordance with this disclosure.

Shown in FIG. 1 is a hot-runner assembly 10 for use in delivering liquid resin (typically a molten thermoplastic composition) from an injection molding machine (not shown) to a mold cavity 12 defined by mold plates 14, 16. The resin flows from the injection molding machine into a channel 18 disposed in a sprue bushing 20 heated by electrical resistance heating element 22 and is distributed through manifold channels 24 defined in heated (or heatable) manifold 26. The heated manifold is provided with electrical resistance heating elements 28 capable of maintaining the resin at a desired temperature that facilitates flow. The resin flows from the manifold channels 24 into an annular space 30 defined between internal walls 32 of nozzles 34 and a valve pin 36 that is linearly movable within nozzle 34 along a vertical longitudinal axis of the nozzle between an open position (shown for the nozzle on the left in FIG. 1) and a closed position (shown for the nozzle on the right in FIG. 1). When the valve pin 36 is in the open position, liquid resin flows into mold cavity 12. Nozzles 34 are maintained at a temperature sufficient to keep the resin in a liquid (flowable) state by electrical resistance heating elements 38. Nozzles 34 can be provided with external threads 40 on the inlet end of the nozzle which engage internal threads of a bore through the bottom of manifold 26 to provide a fluid-tight seal. The mold can define a single cavity or multiple cavities, and each cavity can be supplied with resin from a single nozzle or multiple nozzles.

The position and rate of movement of valve pins 36 are controlled by an actuator 100. Actuator 100 includes a body and/or housing for an electric motor 101 and converts rotational movement of the electric motor into linear movement (up and down in FIG. 2) of a drive shaft 102, which in the illustrated example has an elongate internally threaded bore 104. Rotation of motor 101 generally around axis 105 can be connected to linear movement of drive shaft 102 such as by providing threaded structure on the rotor of electric motor 101 that engages external threads on drive shaft 102.

The extent of travel of drive shaft 102 can be limited to the confines of the body of actuator 100. Bore 104 has a central axis 105 coincident with the central axis of pin 36 and nozzle 34. The body and/or housing of actuator 100 has a bottom opening 107 and a top opening 109 that allows access to threaded bore 104 to allow an externally threaded valve pin nut 106 to be threaded into bore 104. A lock nut 108 can be threaded into bore 104 from the top opening to lock the position of nut 106 and valve pin 36 after it has been adjusted. A lower end of nut 106 has an inwardly projecting semi-circumferential rim 111 that engages a circumferential groove 112 at an upper end of valve pin 36 to secure valve pin 36 to nut 106. An opening in the rim allows the valve pin 36 to be inserted into nut 106. The threaded connection between valve pin nut 106 and drive shaft 102 can be replaced with a fixed or other connection between the shaft 102 and nut 106, although this would eliminate the possibility of manually adjusting the valve pin position (as described below).

Nut 106 has a tool-head engagement structure 114 that can be engaged by a tool, such as an allen wrench to allow manual adjustment of the position of nut 106 and pin 36. Similarly, lock nut 108 has a tool-head engagement structure 116 to allow tightening of lock nut 108 against valve pin nut 106 using a tool such as an allen wrench. In the illustrated embodiment, engagement structures 114 and 116 are hexagonal sockets. However, other shapes or tool-engagement means are possible. Top plate 64 can be provided with openings or bores 117 to allow access to tool engagement structure (e.g., sockets 114, 116) to allow manual adjustment of the valve pin position without removal of plate 64 or disassembly of hot-runner assembly 10.

Electrical connectors 118, 120 are provided for powering and controlling the electric motor, and to power and receive signals from an encoder that tracks drive shaft position.

A coolant inlet port 122 and a coolant outlet port 124 are provided to allow a coolant (e.g., chilled water or oil) to be circulated through the body and/or housing of the actuator to protect the motor against degradation or failure caused by overheating.

Actuator 100 can be supported on an insulating support member 126. Support 126 can, and preferably does, have a relatively low thermal conductivity. Preferred materials for member 126 are stainless steel and titanium or other material having a thermal conductivity equal to or less than the thermal conductivity of titanium. Support 126 can be releasably secured to manifold 26, such as with screws or bolts (not shown).

When assembled, the upper end of valve pin 36 extends into bore 104 through openings in manifold 26, support 126 and the body or housing of actuator 100 to provide a vertically compact design for apparatus 10.

Figure 3:
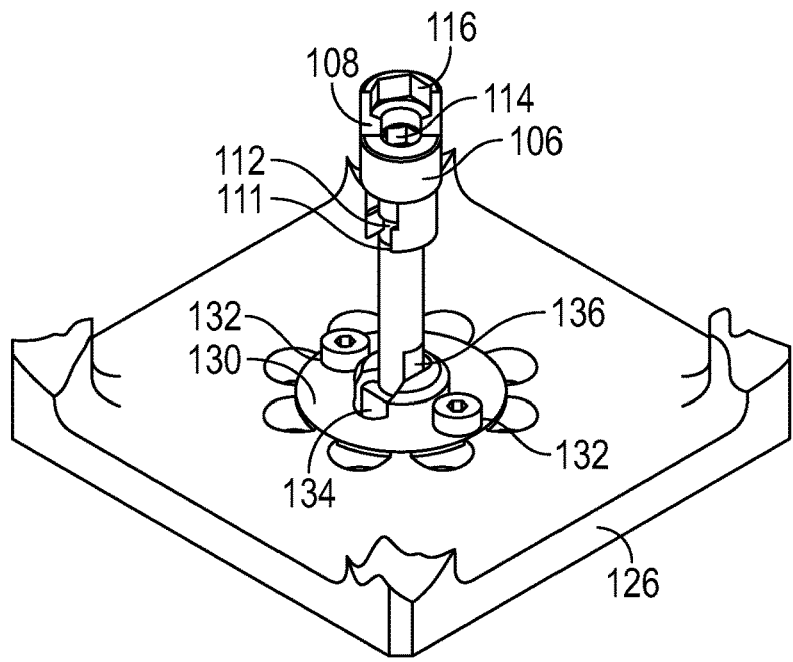
FIG. 3 is a perspective view of an actuator support and mechanism for fixing the valve pin to a linear drive shaft.

An anti-rotation plate or guide 130 can be releasably secured to support 126 with bolts 132. Plate 130 has an aperture 134 for passage of valve pin 36. Aperture 134 has a shape configured to engage a section of valve pin 36 having a non-circular profile to prevent rotation of the pin around the longitudinal axis of the pin 36 and nozzle 34. In the illustrated embodiment, the non-circular profile includes two opposing flat or planar surfaces 136 (one of which is shown in FIG. 3). While flat surfaces 136 are engaged by straight edges of aperture 134 in the illustrated embodiment, other anti-rotational means can be provided, such as splines, grooves, and other structures that can prevent rotation of valve pin 36.

Manifold 26 and actuators 100 are located in a space generally bounded by a top mold plate 64 and an intermediate mold plate 66.

Assembly 10 can also include various lower support elements 68, dowels 70, and upper support elements 72 for facilitating proper alignment and spacing of the components of the assembly.

A pin seal 138 prevents liquid resin from leaking upwardly from channel 24 of manifold 26.

The disclosed apparatus allows adjustment of the valve pin using dedicated tools/wrenches etc. from the back side of the actuator (opposite valve pin or valve pin elongation side).

The disclosed apparatus can allow coupling and decoupling of the cooled actuator axially to the valve pin.

The valve pin can be suspended within the height of the actuator.

The disclosed apparatus can also allow mounting of the cooled actuator axially to the valve pin on a thermal insulation support in direct contact to the hot-runner manifold; wherein the support can protrude along the actuator corners.

Figure 2:
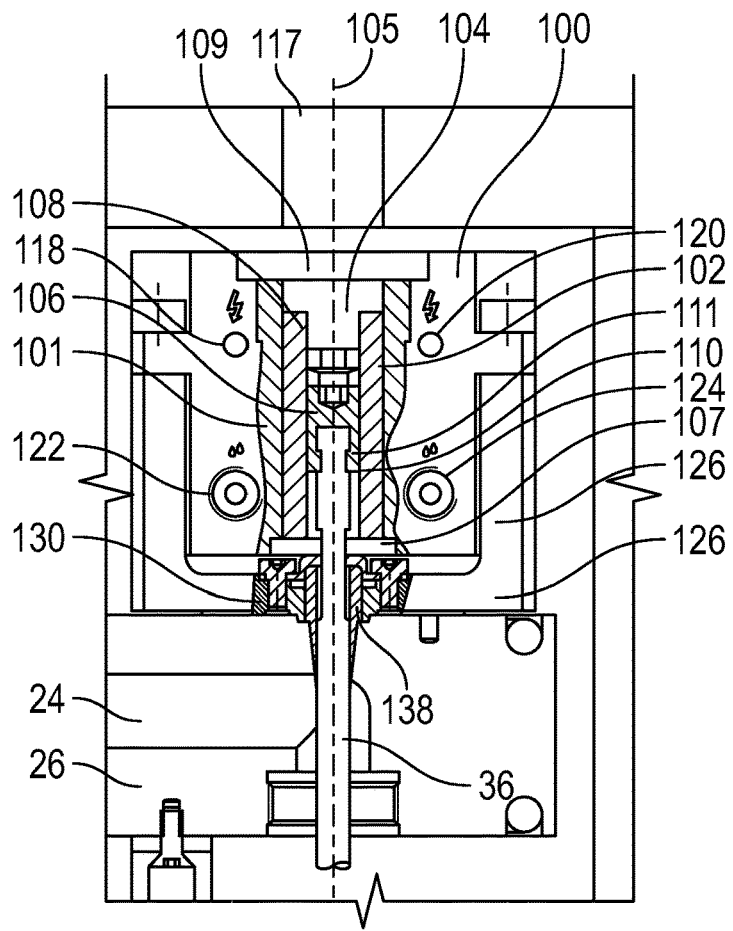
FIG. 2 is an enlarged view of the actuator and a portion of the hot-runner manifold on which the actuator is supported.
Figure 4:
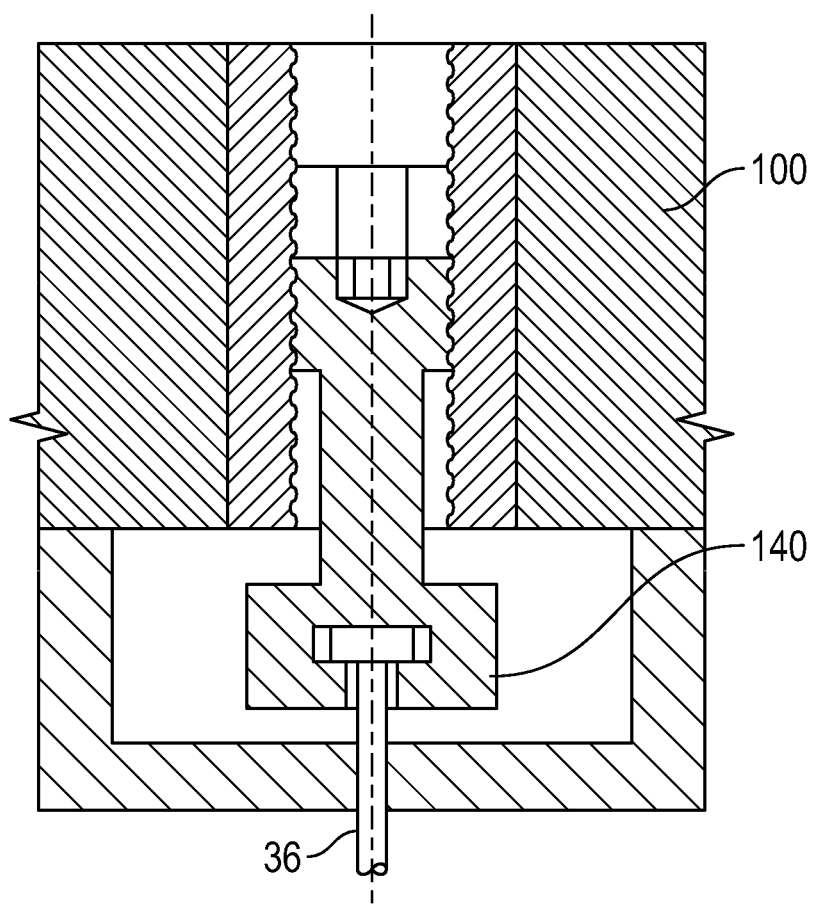
FIG. 4 is an enlarged cross-sectional view of an alternate embodiment in which the valve pin is indirectly coupled to the actuator drive shaft via a valve pin extension.

Shown in FIG. 4 is an alternative arrangement in which the valve pin 36 is indirectly coupled to drive shaft 102 (rather than directly as shown in FIGS. 1 and 2) by a valve pin extension 140.

The actuator 100 can be installed and coupled to the valve pin 36 axially, i.e., without moving the actuator laterally away from axis 105. This can be accomplished by first positioning the valve pin through the manifold and into the associated nozzle with an upper end of the valve pin projecting upwardly from the top of the manifold (i.e., the surface opposite the surface from which the nozzles extend). Thereafter, support 126 can be attached to the manifold (such as with screws) and anti-rotation plate 130 can be positioned around valve pin 36 and secured to the support with bolts 132. Next, nut 106 can be positioned onto the head (top end) of valve pin 36. Actuator 100 is then positioned with the bore of drive shaft 110 in axial alignment with the valve pin. The tool engagement structure of nut 106 can then be accessed via the top opening 109 of actuator 100 with a tool to rotate nut 106 and thread nut 108 into the threaded bore 104 of driveshaft 102.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. An injection molding apparatus, comprising:
   a manifold defining a resin channel for conveying liquid resin from an injection molding machine toward a mold cavity;
   a nozzle for conveying liquid resin from the resin channel to the mold cavity;
   a valve pin configured for linear movement along a longitudinal axis of the nozzle to control flow of liquid resin through the nozzle;
   an electric actuator having a body containing an electric motor and a liner drive shaft with a bore, wherein both the electric motor and the linear drive shaft are contained within the body of the electric actuator, and wherein the valve pin is directly or indirectly coupled to the drive shaft within the bore, such that linear movement of the drive shaft produces co-linear movement of the valve pin; wherein the bore extending through the drive shaft is internally threaded and the valve pin is directly or indirectly coupled to the drive shaft via an externally threaded valve pin nut threadingly engaging the internally threaded bore;
   wherein the valve pin nut has a tool-head engagement structure for manual positioning of the valve pin and valve pin nut with respect to the drive shaft; and
   further comprising an externally threaded lock nut threadingly engaging the internally threaded bore and disposed adjacent a side of the valve pin nut opposite the valve pin.

2. The apparatus of claim 1, wherein the lock nut has a tool-head engagement structure for manual tightening of the lock nut against the valve pin nut.

3. An injection molding apparatus, comprising:
   a manifold defining a resin channel for conveying liquid resin from an injection molding machine toward a mold cavity;
   a nozzle for conveying liquid resin from the resin channel to the mold cavity;
   a valve pin configured for linear movement along a longitudinal axis of the nozzle to control flow of liquid resin through the nozzle; and
   an electric actuator having a body containing an electric motor and a linear drive shaft with a bore, wherein both the electric motor and the linear drive shaft are contained within the body of the electric actuator, and wherein the valve pin is directly or indirectly coupled to the drive shaft within the bore, such that linear movement of the drive shaft produces co-linear movement of the valve pin; and
   wherein the electric actuator is mounted on a support attached to the manifold, and further comprises an anti-rotation plate disposed between a bottom of the support and the electric actuator and releasably attached to the bottom of the support, the anti-rotation plate having an aperture for passage of the valve pin, the aperture having a shape configured to engage a section of the valve pin having a non-circular profile to prevent rotation of the pin around the longitudinal axis of the nozzle.

* * * * *